United States Patent [19]

Bouton

[11] Patent Number: 4,663,234

[45] Date of Patent: May 5, 1987

[54] COATING CAPABLES OF RESISTING TO HIGH THERMAL STRESS AND PARTICULARLY TO COATINGS FOR SATELLITES AND SPATIAL VESSELS AND TO METHODS FOR PRODUCING THOSE COATINGS

[75] Inventor: Francois A. Bouton, Montcealles Min, France

[73] Assignee: Agence Spatiale Europeenne, Paris, France

[21] Appl. No.: 680,259

[22] PCT Filed: Mar. 9, 1984

[86] PCT No.: PCT/FR84/00055

§ 371 Date: Nov. 9, 1984

§ 102(e) Date: Nov. 9, 1984

[87] PCT Pub. No.: WO84/03481

PCT Pub. Date: Sep. 13, 1984

[30] Foreign Application Priority Data

Mar. 11, 1983 [FR] France .............................. 83 04022

[51] Int. Cl.$^4$ .................... B32B 27/06; B32B 15/08
[52] U.S. Cl. .................................. 428/422; 244/163; 428/457; 428/699; 428/701

[58] Field of Search ................. 428/35, 422, 457, 699, 428/701; 244/163; 427/250, 252, 248.1

[56] References Cited

U.S. PATENT DOCUMENTS 3,384,324  5/1968  O'Sullivan ......................... 244/163
4,008,348  2/1977  Slemp .................................. 428/35

Primary Examiner—Thomas J. Herbert
Attorney, Agent, or Firm—Oblon, Fisher, Spivak, McClelland & Maier

[57] ABSTRACT

A composite coating for objects subjected to high thermal stresses.

This composite coating comprises a first layer made of a material suitable for ensuring heat control, an intermediate layer made of a transparent, amorphous inorganic substance insensitive to water and alcohol, and a third layer, or outer layer, made of a conducting transparent material, the coefficient of thermal expansion of the transparent, amorphous inorganic substance forming the intermediate layer being between the coefficients of thermal expansion of the materials forming the first and third layers of the composite coating. A process for the production of a composite coating of this type.

Application to satellites and spacecrafts.

7 Claims, No Drawings

COATING CAPABLES OF RESISTING TO HIGH THERMAL STRESS AND PARTICULARLY TO COATINGS FOR SATELLITES AND SPATIAL VESSELS AND TO METHODS FOR PRODUCING THOSE COATINGS

FIELD OF THE INVENTION

The present invention relates to new coatings capable of withstanding high thermal stresses such as those to which satellites and spacecraft are subjected, and to a process for the production of these coatings. The present invention relates more particularly to coatings suitable for preventing the formation of cracks in the electrically conducting layer of the second-surface mirrors which form the outer surface of satellites.

PRIOR ART

The equilibrium temperature of a satellite is normally maintained by passive temperature control. This control is effected by applying to the outer surfaces of the satellite materials which are totally reflecting and which must simultaneously possess properties of weak solar absorptance and of strong infrared emittance. The materials satisfying these conditions which are most often used are dielectric materials such as white paints, silica glass or cerium-doped glass whose rear face is coated with silver, "KAPTON" (registered trademark denoting a film of polyimide resin) or "TEFLON" FEP (registered trademark denoting fluorinated ethylene/propylene) whose rear face is also coated with silver or aluminum.

In geostationary orbit, a satellite is exposed not only to solar radiation but also to space plasma, which has the effect of accumulating electrical charges on its outer surface. On insulated surfaces in shadow, potentials of as much as 19 kV, due to the interaction of solar radiation and space plasma on the surface of a satellite, have been recorded, whereas the illuminated surfaces of the same satellite have potentials on the whole of around zero. Such potential differences lead to arc discharges, the effect of which is to degrade the thermo-optical and mechanical properties of the satellite coating, to produce noisy radio-frequency interference emissions and, in certain cases, to cause the on-board electronic equipment to switch from one state to another.

While the accumulation of electrical charges on a spacecraft of satellite can harm the operation of scientific satellites carrying plasma experiments, application satellites could tolerate surface potentials of as much as several hundred volts, provided that discharges can be avoided.

A solution has been proposed to the problems presented by the accumulation of electrical charges on satellites, whether scientific satellites or application satellites; this solution consists in providing a spacecraft with a conducting outer skin having a ground connection to the metal part of the structure of the spacecraft. This solution is based on the principle that the application and interconnection of conducting surface materials makes it possible to avoid charge differences and favors the setting-up of an equalization of the potentials on the surface of the spacecraft.

The development of GEOS, which is a geostationary scientific satellite, demonstrated that this solution is valid; GEOS was the first satellite to have a more than 96% conducting surface.

Several combinations of materials were examined and tested for the purpose of ensuring thermal-control and rendering the outer surface of the satellites conducting. White paints provided with conducting loadings, coatings made of textured silver or quartz, and transparent conducting coatings deposited on the front face of second-surface mirrors, represent examples of such combinations of materials. The second-surface mirrors can be made of silica glass, cerium-doped glass, "KAPTON" or "TEFLON" FEP.

The outer surfaces of a satellite are exposed to the various components of the space environment (particles, ultraviolet radiation, vacuum, thermal conditions). One of the consequences of exposure to this environment is degradation of the physical properties of the dielectric materials applied to the outer skin to ensure heat control. This degradation can cause these materials to change color, which generally results in an increase in the solar absorptance. It is known that such a modification is mainly due to the high-energy electrons and protons encountered in orbit and also to the powerful flux of ultraviolet radiation in the outer atmosphere.

It is for this reason that it is of prime importance to choose thermal-control materials which not only possess a weak absorptance but also have thermo-optical properties which remain virtually undegraded in the space environment. Now, white paints, silica and textured quartz have a high coefficient of degradation of their thermal-optical properties in the space environment, and "KAPTON" covered with a transparent conducting coating possesses a high solar absorptance due to its yellow color.

Rigid mirrors made of cerium-doped glass or silica glass covered with a transparent conducting coating are fragile. Their maximum size is 4 cm+4 cm and they must be handled individually when they are stuck to the substrate material during the manufacture of the radiator panels. Furthermore, these mirrors cannot be applied to surfaces having a small radius of curvature. One is therefore faced with an obvious lack of versatility.

Flexible mirrors made of "TEFLON" FEP and covered with a transparent conducting layer have parallel streaks on the "TEFLON" surface which are due to the process used to manufacture the "TEFLON" sheet (by extrusion). This can result in degradation by ageing.

Qualification tests carried out to determine the degradation of the solar absorptance of the abovementioned thermal-control materials having conducting properties, in particular by ultraviolet radiation, showed that not only rigid mirrors based on glass but also flexible mirrors made of "TEFLON" FEP have a relatively low coefficient of degradation.

However, only the flexible mirrors made of "TEFLON" FEP were selected for further consideration, because of the fact that they can be applied more easily to the surfaces of spacecraft. In the course of the qualification tests, they were subjected to thermal-cycle tests carried out in accordance with the procedure used to select materials and processes which can be employed in space, and developed by the Applicant under the reference "ESA-PSS-01-704".

In the course of these tests, which are carried out in a vacuum chamber, the chamber undergoes a thermal cycle at test temperatures of between +100° C. and −100° C., with an average heating or cooling rate of 10° C. per minute. The dwell time for a given specimen is 5 minutes at each of the extreme temperatures. There are 100 cycles.

Following these tests, the mirrors were examined under a microscope and it was shown that the transparent conducting coatings contained cracks.

From the comments made earlier about the accumulation of electrical charges on the outer surface of spacecraft, it is apparent that the presence, in the conducting coatings, of cracks resulting from thermal cycles in orbit can reduce or eliminate the surface conductivity and consequently disrupt the equilibrium of potentials on the surface of the satellite.

O. K. HUSMANN et al. (cf.: "Proceedings of Spacecraft Thermal and Environmental Control Systems Symposium", Munich, 10th–12th Oct. 1978, published in ESA-SP-139, November 1978) proposed retarding the degradation of the solar absorptance of second-surface mirrors made of "TEFLON" FEP by depositing on the front surface of these mirrors thin coatings consisting alternately of ZnS and $Al_2O_3$, which form an "interference filter", and covering this coating with a thin, transparent conducting layer of $In_2O_3$. Moreover, to reduce the tendency of the interference filter and hence of the conducting coating to crack during the thermal cycle, a thin layer of varnish is placed directly on the front face of the "TEFLON" REP substrate after a thin film of aluminum has been deposited. The layer of varnish is placed between the substrate and the interference filter. Three types of varnish were tested by the author in respect of the degradation of the solar absorptance and the resistance to the formation of cracks. It was shown, however, that even if the layer of varnish reduces the cracks during the thermal cycle, it does not eliminate them, and also tends to increase the solar absorptance in accordance with its thickness.

Although the layer of varnish considerably increases the stability of the protective coatings (and the conducting coating) against the formation of cracks, the cracks are still not totally eliminated.

Another disadvantage of the use of varnish for space applications is the fact that it is an organic substance which, by virtue of its composition, is liable to degrade in the space environment. The tests mentioned by these authors did in fact demonstrate that the solar absorptance of the varnishes used degrades under the action of radiation.

SUMMARY OF THE INVENTION

The object of the present invention is consequently to provide a coating for objects subjected to high thermal stresses, such as space satellites in particular, and to provide a process for the production of these coatings, which satisfy the practical requirements better than the coatings intended for the same purpose and proposed according to the prior art, especially in as much as they afford long-lasting prevention of the formation of fractures, during the thermal cycle, in the conducting coatings of second-surface mirrors made of materials such as, for example, "TEFLON" FEP.

The present invention relates to a transparent coating made of an amorphous inorganic substance, which is intended to be deposited between the coating suitable for ensuring thermal-control and the transparent conducting coating.

DETAILED DESCRIPTION OF THE PREFERRED EMBODIMENTS

In a preferred embodiment of this intermediate coating, the latter has a coefficient of thermal expansion which is between the coefficient of thermal expansion of the coating suitable for ensuring thermal-control and the coefficient of thermal expansion of the transparent conducting coating.

The intermediate coating according to the invention serves to withstand the tension created during the thermal cycle between the coating made of a material suitable for ensuring thermal control and the transparent conducting coating because of the large difference between their coefficients of thermal expansion, thus preventing the formation of fractures in the coating.

The material used to produce the intermediate coating according to the invention must be transparent so as to preserve the optical properties of the mirror. It must be an inorganic substance in order to avoid degradation of its optical properties in a space environment. Finally, it must be insensitive to the action of water and alcohol in the event that the transparent conducting coating is accidentally damaged during the manipulations and cleaning of the spacecraft or space satellite.

According to an advantageous provision of the invention, the material used to produce the said intermediate coating is chosen from the group comprising $Bi_2O_3$, $SiO_2$, $GeO_2$, $WO_3$, $Ga_2O_3$, $Sb_2O_3$, $TeO_2$, $LiF$, $NaF$ and mixtures of these compounds, preference being given to $Bi_2O_3$.

In a preferred embodiment of the invention, the coating suitable for ensuring thermal-control is a coating made of "TEFLON" fluorinated ethylene/propylene.

The present invention also relates to a composite coating for objects subjected to high thermal stresses, and especially for space satellites, which comprises a first layer made of a material suitable for ensuring the thermal-control of the said object, an intermediate layer made of a transparent, amorphous inorganic substance insensitive to water and alcohol, and a third layer, or outer layer, made of a transparent conducting material, the coefficient of thermal expansion of the transparent, amorphous inorganic substance forming the intermediate layer being between the coefficients of thermal expansion of the materials forming the first and third layers of the composite coating.

The present invention also relates to a process for the production of a composite coating consisting of layer of thermal-control material, an intermediate layer and a conducting coating, which consists in vacuum-depositing a transparent intermediate layer of amorphous inorganic substance between a layer of thermal-control material and a transparent, conducting outer coating.

A preferred embodiment of the process according to the invention for the production of a composite coating consisting of a layer of heat-control material, an intermediate layer and a conducting coating consists in: evaporating powder of an appropriate transparent, amorphous inorganic substance by heating in vacuum; vacuum-depositing the said evaporated material onto substrates made of a material suitable for ensuring heat control, which are fixed to a cage rotating at 10–15 rpm and are placed at an appropriate distance from the source of inorganic substance evaporated, in order to give a homogeneous deposit on the said substrates; evaporating powder of a transparent conducting material by heating in vacuum; and depositing the said evaporated material onto the layer of transparent, amorphous inorganic substance deposited on the rotating substrates, in order to give a homogeneous deposit of a transparent conducting coating.

According to an advantageous provision of this embodiment, the operation involving deposition of the intermediate layer made of transparent, amorphous inorganic substance is monitored by measuring the thickness of the deposit using a quartz balance placed in the top part of the enclosure for evaporation and deposition of the said intermediate layer in vacuum.

According to another advantageous provision of this embodiment, the operations involving deposition by evaporation in vacuum are carried out under a vacuum equal to or greater than $10^{-6}$ Torr.

According to yet another advantageous provision of this embodiment, the temperature of the substrates is preferably maintained at $25°$ C.$\pm 1°$ C. during the operation involving deposition of the layer of transparent, amorphous inorganic substance.

In addition to the above provisions, the invention also includes other provisions, which will become apparent from the following description.

The invention relates more particularly to the intermediate coatings and the composite coatings obtained according to the above provisions, and also to the second-surface mirrors provided with the said composite coatings, and the objects covered with such composite coatings.

The invention will be understood more clearly with the aid of the following supplementary description, which relates to a practical embodiment of the process forming the subject of the present invention.

It must be clearly understood, however, that this practical embodiment is given solely by way of illustration of the subject of the invention and in no way implies a limitation thereof.

EXAMPLE

Powdered $Bi_2O_3$, having a coefficient of thermal expansion which is between the coefficient of thermal expansion of "TEFLON" FEP ($80 \times 10^6/°$C.) and the coefficient of thermal expansion of indium oxide ($\simeq 7 \times 10^6/°$C.), is placed in a crucible made of a refractory metal such as, for example, tungsten, which is itself placed in a vacuum evaporation apparatus making it possible to achieve a high vacuum equal to or greater than $10^{-6}$ Torr, such as the BALZERS BA 510 Automatic apparatus. The powder is evaporated by heating, especially with a heating resistor, or by means of an electron gun or alternatively by radio-frequency sputtering. The "TEFLON" FEP substrates are placed at an average distance of 40 cm from the crucible, which is the center of the evaporation, and are fixed to a cage which is rotated at a speed of 12 rpm so as to give a homogeneous deposit. The thickness of this deposit, which is advantageously of the order of 25 to 50 Å, is monitored by a quartz balance located in the top part of the vacuum evaporation apparatus. The vacuum is monitored by means of a gauge and the temperature of the substrates is monitored by means of an appropriate thermocouple, for example a Chromel-Alumel thermocouple.

The conducting coating is then produced by the reactive evaporation, in vacuum, of indium in an oxygen atmosphere to give indium oxide, $In_2O_3$, in vapor form, which is deposited onto the layer of $Bi_2O_3$ at a deposition rate of 0.33 to 5 Å/second, under the same conditions as those described above, to form a 100 to 150 Å layer of $In_2O_3$, and which is optionally annealed for 8 hours at $100°$ C. in order to increase its transmittance.

Although this is not critical, it is advantageous to maintain the "TEFLON" FEP substrates at a temperature of the order of $25°$ C. during the operation involving deposition of the layer of $Bi_2O_3$; however, although temperatures above $25°$ C., of the order of $100°$ C. or even higher, do not afford any advantage, they do not have any adverse effect on the substrate.

The composite coating formed in this way was subjected to a thermal cycle according to the specifications drawn up by the Applicant, i.e. 100 cycles at $+100°$ to $-100°$ C. with a cycle duration of one hour.

Following the thermal cycle, the composite coating according to the invention was examined under a microscope: no trace of fracture was observed in the transparent conducting coating of $In_2O_3$.

The specimens tested do not shown any degradation of their solar absorptance properties after an exposure of 2500 ESH (equivalent sun hours) to ultraviolet radiation: in fact, after exposure to ultraviolet radiation, their solar absorptance is the same as before exposure.

Furthermore, the parallel streaks which can be observed on all the other "TEFLON" FEP coatings proposed in the prior art, are no longer apparent in the composite coating according to the invention, because of the interaction of the intermediate layer of $Bi_2O_3$ with the surface of the FEP during the deposition of the intermediate layer; the total elimination of the streaks inherent in FEP by the deposition of the intermediate layer between the FEP and the conducting coating is of great practical importance because of the fact that these streaks can act in the long term as initiator sites for degradation.

In the foregoing example, the conducting coating is made of indium oxide; it will easily be understood, however, that the composite coating can contain any other appropriate transparent conducting coating meeting the requirements, such as, for example, tin oxide, tin-doped indium oxide, pure or doped cadmium stannate or cadium oxide, etc.

Likewise, although reference has been made above to "TEFLON" FEP substrates because of the specific application of the composite coatings according to the invention to second-surface mirrors, i.e. to reflectors which form the outer surface of satellites or spacecraft, it will easily be understood that the invention encompasses composite coatings which contain substrates other than "TEFLON" FEP, and especially "KAPTON" substrate, to the extent that the applications for which they are intended tolerate high absorptance properties or a lower flexibility than that of "TEFLON" FEP.

As is apparent from the foregoing text, the invention is in no way restricted to those methods of implementation, embodiments and methods of application which have now been described more explicitly; on the contrary, it includes all the variants which may occur to those skilled in the art, without deviating from the framework or the scope of the present invention.

What is claimed is:

1. A composite coating for an object subjected to high thermal stress, comprising a first inner layer made of a thermal control material, a second intermediate layer made of a transparent amorphous inorganic material which is insensitive to the action of water or alcohol, and a third outer layer made of a transparent conducting material, wherein the coefficient of thermal expansion of the said transparent amorphous inorganic substance forming the intermediate layer is between the coefficient of thermal expansion of the materials forming the said first and the said third layers of the composite coating.

2. The composite coating of claim 1, wherein the said layer made of a thermal control material is made of a fluorinated ethylene-propylene polymer.

3. A composite coating for a satellite, comprising a first inner layer made of a thermal control material, a second intermediate layer made of a transparent amorphous inorganic material insensitive to the action of water or alcohol, and a third outer layer made of a transparent conducting material, wherein the coefficient of thermal expansion of the transparent amorphous inorganic substance forming the intermediate layer is between the coefficient of thermal expansion of the materials forming the said first and the said third layers of the composite coating.

4. In a composite coating for an object subjected to high thermal stress, said composite coating containing:
   (i) as an inner layer a second-surface mirror suitable for ensuring thermal control of the said object and comprising a dielectric material, the rear face of which is coated with a reflective material, and
   (ii) an outer layer made of a conducting material for protection against electrostatic charging of the said object surface, the improvement comprising:
   (iii) an intermediate layer made of an amorphous inorganic material preventing crack formation in the said conducting layer due to thermal cycling, which amorphous inorganic material has a coefficient of thermal expansion which is between the coefficient of thermal expansion of the said dielectric material and the said outer layer, respectively, and wherein the said amorphous inorganic material is not sensitive to the action of water and alcohol, said amorphous inorganic material being at least one member selected from the group consisting of metal oxides, lithium fluoride, and sodium fluoride.

5. In a composite coating for an object subjected to high thermal stress, said composite coating containing:
   (i) as an inner layer a second-surface mirror suitable for ensuring thermal control of the said object and comprising a dielectric material, the rear face of which is coated with a reflective material, and
   (ii) an outer layer made of a conducting material for protection against electrostatic charging of the said object's surface, the improvement comprising:
   (iii) an intermediate layer situated between the said inner layer and the said outer layer, said intermediate layer being made of an amorphous inorganic material preventing crack formation in the said conducting layer due to thermal cycling, which amorphous inorganic material has a coefficient of thermal expansion which is between the coefficients of thermal expansion of the said dielectric material and the said outer layer, respectively, and wherein the said amorphous inorganic material is not sensitive to the action of water and alcohol.

6. The composite coating of claim 5, wherein the said intermediate layer comprises a material which is at least one member selected from the group consisting of $Bi_2O_3$, $SiO_2$, $GeO_2$, $WO_3$, $Ga_2O_3$, $Sb_2O_3$, $TeO_2$, LiF, NaF and mixtures thereof.

7. The composite coating of claim 6, wherein the said material is $Bi_2O_3$.

* * * * *